3,790,573
IMIDAZO AND PYRIMIDO[2,1-b]QUINAZOLINES
Dale W. Blackburn, Moorestown, N.J., and Robert F. Devenney, Newtown Square, and Timothy Yu-Wen Jen, Broomall, Pa., assignors to Smithkline Corporation, Philadelphia, Pa.
No Drawing. Filed Nov. 11, 1971, Ser. No. 197,916
Int. Cl. C07d 51/48
U.S. Cl. 260—256.4 F                8 Claims

ABSTRACT OF THE DISCLOSURE

The compounds are hexahydro, octahydro and decahydro imidazo[2,1-b]quinazolines and pyrimido[2,1-b]quinazolines which have hypotensive activity. For example, compounds of this invention are 1,2,3,5,6,7,8,9-octahydroimidazo[2,1-b]quinazoline and 1,2,3,4,7,8,9,10-octahydro-6H-pyrimido[2,1-b]quinazoline.

---

This invention relates to new hexahydro, octahydro and decahydro imidazo[2,1-b]quinazoline and pyrimido[2,1-b]quinazoline compounds having pharmacodynamic activity, in particular, having hypotensive activity. The hypotensive activity is demonstrated, for example, by administration to anesthetized rats at doses of about 0.125 to about 4.0 mg./kg. intravenously.

The compounds of this invention are represented by the following formulas:

Formula I 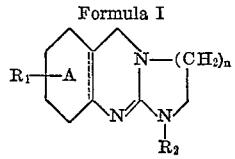   Formula II 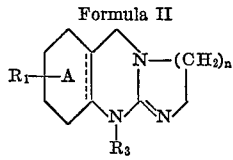

in which:

$R_1$ is hydrogen, chloro, bromo, trifluoromethyl, lower alkyl, lower alkoxy, sulfamoyl or hydroxy;
$R_2$ is hydrogen, lower alkyl or lower alkanoyl;
$R_3$ is lower alkyl;
$n$ is 1 or 2; and
⫴ is a single or double bond and when ⫴ is a double bond, ring A optionally has one additional double bond, except that $R_1$ is not chloro or bromo when ring A has two double bonds, and pharmaceutically acceptable acid addition salts thereof.

Preferred compounds of this invention are the octahydro compounds, that is the compounds of Formulas I and II in which ring A has one double bond.

Advantageous compounds of this invention are the compounds of Formula I in which $R_1$ is hydrogen, chloro, methyl or methoxy, $R_1$ being in the 6, 7 and 8 position when $n$ is 1 or in the 7, 8 or 9 position when $n$ is 1 or in the 7, 8 or 9 position when $n$ is 2, particularly hydrogen, and $R_2$ is hydrogen.

Particularly advantageous compounds of this invention are 1,2,3,5,6,7,8,9 - octahydroimidazo[2,1-b]quinazoline and the fumarate salt thereof.

Compounds of Formula I in which $R_2$ is hydrogen may exist in the tautomeric forms which are represented by Formula I or by Formula II in which $R_3$ is hydrogen.

The compounds of Formulas I and II in which ⫴ is a single bond may exist as cis and trans stereoisomers. It is intended to include in this invention the separated cis and trans isomers as well as mixtures thereof.

The hexahydro compounds of Formulas I and II in which $R_1$ is hydroxy may exist in the enol or keto forms; under most conditions, it is expected that these compounds are principally in the keto form.

The terms "lower alkyl" and "lower alkoxy" where used herein denote groups having 1–4 carbon atoms and the term "lower alkanoyl" denotes groups having 2–4 carbon atoms.

The compounds of this invention are prepared according to the following procedures.

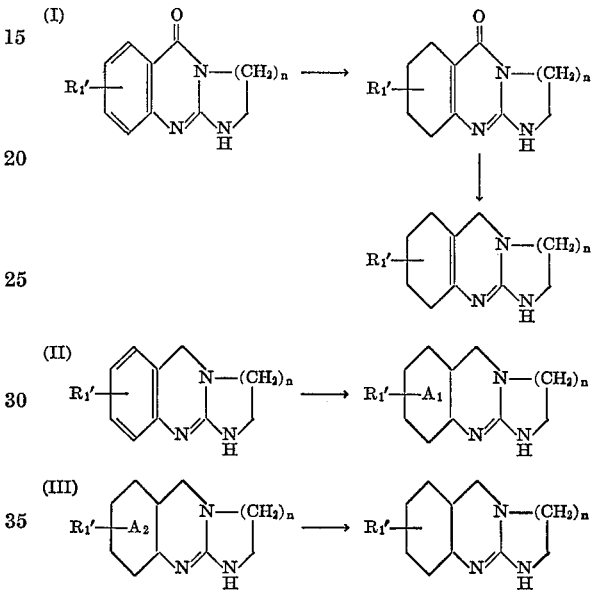

The term $R_1'$ is hydrogen, trifluoromethyl, lower alkyl, lower alkoxy, sulfamoyl or hydroxy, ring $A_1$ is a cyclohexadiene ring, ring $A_2$ is a cyclohexene, cyclohexadiene or benzene ring and $n$ is as previously defined.

According to procedure I above, an imidazo or pyrimido[2,1-b]quinazolone is subjected to catalytic hydrogenation to reduce the benzene ring to a cyclohexene ring and then the carbonyl group is reducing using, for example, a metallic hydride such as sodium bis(2-methoxyethoxy)aluminum hydride or lithium aluminum hydride or a reducing system such as phosphorus pentasulfide and Raney nickel to give N-unsubstituted octahydro imidazo [2,1-b]quinazolines and pyrimido[2,1-b]quinazolines of this invention.

According to procedure II, a tetrahydro imidazo or pyrimido[2,1-b]quinazoline is reduced using an alkali metal, preferably lithium, in liquid ammonia to give N-unsubstituted hexahydro imidazo[2,1-b]quinazolines and pyrimido[2,1-b]quinazolines of this invention.

According to procedure III, a tetrahydro, hexahydro or octahydro imidazo or pyrimido[2,1-b]quinazoline is reduced by catalytic hydrogenation to give N-unsubstituted decahydro imidazo[2,1 - b]quinazolines and pyrimido [2,1-b]quinazolines of this invention.

The catalytic hydrogenation in procedures I and III is preferably carried out in aqueous acid such as aqueous sulfuric acid using a catalyst such as rhodium-on-carbon, platinum oxide or platinum-on-carbon, preferably rhodium-on-carbon.

The hexahydro compounds prepared according to procedure II may be obtained as a mixture of isomers in which the additional bond in the A ring is in one of the three possible positions, i.e. in the 6,7; 7,8 or 8,9 position in the imidazoquinazolines or the 7,8; 8,9 or 9,10 position in the pyrimidoquinazolines. These isomers may be separated by chromatography. In the following examples, the additional double bond is indicated as in the 7,8-position in the imidazoquinazolines and in the 8,9-position in the pyrimidoquinazolines but it is understood that the other isomers may also be obtained.

The compounds of Formulas I and II in which $R_2$ and $R_3$ are lower alkyl are prepared by reacting the N-unsubstituted hexahydro, octahydro or decahydro imidazo [2,1-b]quinazolines and pyrimido[2,1-b]quinazolines with a lower alkyl halide. The 1-lower alkyl and 10(or 11)-lower alkyl compounds prepared by this procedure are separated by fractional recrystallization or chromatography. The compounds of Formula I in which $R_2$ is lower alkanoyl are prepared by reacting the N-unsubstituted compounds with a lower alkanoyl halide or a lower alkanoic anhydride.

The octahydro and decahydro compounds of Formulas I and II in which $R_1$ is chloro or bromo are prepared by treating the corresponding compounds in which $R_1$ is hydroxy with a halogenating agent, for example thionyl chloride to prepare the compounds in which $R_1$ is chloro and thionyl bromide to prepare the compounds in which $R_1$ is bromo.

The tetrahydro imidazo[2,1-b]quinazolinone and pyrimido[2,1-b]quinazolinone starting materials in procedure I are prepared by reacting an isatoic anhydride or a methyl or ethyl anthranilic acid ester with a 2-lower alkylmercapto-2-imidazoline or -tetrahydropyrimidine.

The 2-lower alkylmercapto-2-imidazoline and -tetrahydropyrimidine compounds are prepared by reacting an imidazolidine-2-thione or a hexahydropyrimidine-2-thione with a lower alkyl halide.

Alternatively, the tetrahydro imidazo or pyrimido [2,1-b]quinazolinone starting materials are prepared by reacting a 2,4-dichloroquinazoline with ethylene glycol or 1,3-propanediol in the presence of base, treating the resulting 2-chloro-4-hydroxyalkoxyquinazoline with thionyl chloride, and treating the resulting 2-chloro-3-chloralkyl-3,4-dihydroquinazolin-4-one with ammonia.

The tetrahydro imidazo and pyrimido[2,1-b]quinazoline starting materials are prepared by reducing the carbonyl group of the corresponding tetrahydro imidazo or pyrimido[2,1-b]quinazolinones with, for example, a metallic hydride such as sodium bis(2-methoxyethoxy) aluminum hydride or lithium aluminum hydride or a reducing system such as phosphorus pentasulfide and Raney nickel.

Alternatively, the tetrahydro imidazo and pyrimido [2,1-b]quinazoline starting materials are prepared by reacting a 2-(hydroxyalkylaminomethyl)aniline with a standard reagent to form a guanidine, such as cyanamide or cyanogen bromide, and treating the resulting 2-amino-3,4-dihydro-3-hydroxyalkylquinazoline with phosphorus oxychloride or thionyl chloride or by reacting a 2-amino-3,4-dihydroquinazoline with 1,2-dihaloethane or 1,3-dihalopropane.

The pharmaceutically acceptable, acid addition salts of the compounds of Formulas I and II are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric, and nitric acids. Of course, these salts may also be prepared by the classical method of double decomposition of appropriate salts which is well-known to the art.

The compounds of this invention may be administered internally in conventional dosage forms prepared by incorporating an appropriate dose of the compound with pharmaceutical carriers according to accepted pharmaceutical practices to form pharmaceutical compositions.

The following examples are not limiting but are illustrative of the compounds of this invention and of procedures for their preparation.

EXAMPLE 1

1,2,3,5-tetrahydroimidazo[2,1 - b]quinazolin - 5 - one (116 g.) is dissolved in 1.4 l. of 2 N sulfuric acid and hydrogenated at 100 p.s.i. for five hours at 65–70° C. using 25 g. of 5% rhodium-on-carbon catalyst in a stainless steel one gallon autoclave. The hydrogen uptake is complete after the absorption of two molar equivalents. The catalyst is removed by filtration and the filtrate is treated with hydrogen sulfide and made basic with ammonium hydroxide. The solid material is collected by filtration, washed with water and extracted with hot methanol. is removed from the extract in vacuo to give 1,2,3,5,6,7,8, 9-octahydroimidazo[2,1-b]quinazolin-5-one, M.P. 237° C.

1,2,3,5,6,7,8,9 - octahydroimidazo[2,1 - b]quinazolin-5-one (73 g.), 150 ml. of sodium bis(2-methoxyethoxy) aluminum hydride and 1 liter of toluene is heated at reflux for three hours. The reaction mixture is cooled and quenched with 0.2 liter of water. The resulting suspension is filtered and the filter cake is washed with an additional 0.5 liter of toluene. The combined toluene layers are dried over anhydrous magnesium sulfate, then filtered. The toluene is removed by evaporation and the residue is purified by multiple recrystallization from ethanol to give 1,2,3, 5,6,7,8,9-octahydroimidazo[2,1 - b]quinazolin, M.P. 215–217° C.

EXAMPLE 2

One gram of 1,2,3,5,6,7,8,9-octahydroimidazo[2,1-b] quinazoline is added in portions to 0.72 g. of fumaric acid in 20 ml. of methanol with stirring. The mixture is diluted with the same volume of ether and filtered. The solid material obtained is washed with ether and recrystallized from ethanol to give 1,2,3,5,6,7,8,9-octahydroimidazo[2, 1-b]quinazoline fumarate, M.P. 193–195 C.

EXAMPLE 3

Eleven grams of 1,2,3,5 - tetrahydroimidazo[2,1 - b] quinazoline, prepared by reducing 1,2,3,5 - tetrahydroimidazo[2,1-b]quinazolin-5-one using sodium bis(2-methoxyethoxy)-aluminum hydride in toluene by the procedure of Example 1, is dissolved in 0.3 liter of water containing 4 ml. of sulfuric acid. Ten grams of 5% rhodium-on-carbon is added and the mixture is hydrogenated at 60 p.s.i. in a one liter stainless steel autoclave at 65° C. After the absorption of hydrogen stops at three molar equivalents, the catalyst is removed by filtration. The filtrate is concentrated to 40 ml. and made alkaline with 10 ml. of ammonium hydroxide. The resulting semi-solid is washed with 100 ml. of acetone and extracted with 0.3 liter of chloroform. The chloroform extract is dried over anhydrous magnesium sulfate and the chloroform is removed by evaporation to give, as the residue, 1,2,3,5,5a, 6,7,8,9,9a-decahydroimidazo[2,1-b]quinazoline.

The base is dissolved in 0.3 liter of ethanol and 15 g. of picric acid in 0.2 liter of methanol is added to give, after filtering, 1,2,3,5,5a,6,7,8,9,9a - decahydroimidazo-[2,1-b]quinazoline picrate.

EXAMPLE 4

1,2,3,5,5a,6,7,8,9,9a - decahydroimidazo[2,1 - b] - quinazoline (0.5 g.) is added in portions to a solution of 0.36 g. of fumaric acid in 10 ml. of methanol. The resulting solution is evaporated to dryness. The residue is triturated in ether to give 1,2,3,5,5a,6,7,8,9,9a - decahydroimidazo-[2,1-b]quinazoline fumarate which after recrystallization from isopropanol, melts at 161–162° C.

EXAMPLE 5

1,2,3,5,6,7,8,9 - octahydroimidazo[2,1 - b]quinazoline (1.77 g.) is dissolved in 35 ml. of methanol and hydrogenated at 60 p.s.i. at 65° C. using 0.5 g. of 5% rhodium-on-carbon. After the absorption of one molar equivalent of hydrogen in three hours, the catalyst is filtered off. The filtrate is concentrated to 8 ml., cooled and filtered. The solid material is washed with 50 ml. of acetone and dried to give 1,2,3,5,5a,6,7,8,9,9a - decahydroimidazo[2,1 - b] quinazoline.

EXAMPLE 6

A solution of 1.73 g. of 1,2,3,5-tetrahydroimidazo[2,1-b]quinazoline in 50 ml. of anhydrous tetrahydrofuran is added slowly to 500 ml. of liquid ammonia with stirring. Lithium wire in small sections is added to the mixture until a blue color persists. After stirring for 30 minutes, ethanol is added until the blue color is discharged. The solution is then allowed to evaporate under a stream of nitrogen and the residue is taken up in ethyl acetate. The ethyl acetate solution is washed with water, dried and evaporated to give, as the residue, 1,2,3,5,6,9-hexahydroimidazo[2,1-b]quinazoline which is further purified by recrystallization from ethanol.

EXAMPLE 7

A mixture of 16.7 g. of 5-methoxyanthranilic acid, 12 ml. of concentrated hydrochloric acid and 100 ml. of water is treated with a slow stream of phosgene maintaining the temperature at about 50° C. After two hours, the precipitated solid material is collected by filtration, washed with water and recrystallized from ethanol to give 5-methoxyisatoic anhydride.

5-methoxyisatoic anhydride (9.1 g.) is mixed with 6.5 g. of 2-ethylmercapto-2-imidazoline and the mixture is heated to 150–170° C. until the evolution of gas ceases. The solid is extracted with ethanol and the extracts are concentrated, cooled and filtered to give 7-methoxy-1,2,3,5-tetrahydroimidazo[2,1-b]quinazolin-5-one.

Three grams of the above prepared quinazolinone in 250 ml. of tetrahydrofuran is added slowly to a stirred suspension of 1.0 g. of lithium aluminum hydride in 100 ml. of tetrahydrofuran. The mixture is heated at reflux, then treated with 2 ml. of water, 2 ml. of 15% aqueous sodium hydroxide solution and then 5 ml. of water. The mixture is stirred and filtered. The solid material is extracted with one liter of boiling methanol. The filtrate and the extract are combined and evaporated in vacuo to give as the residue 7-methoxy-1,2,3,5-tetrahydroimidazo-[2,1-b]quinazoline.

Treating the above prepared 7-methoxy - 1,2,3,5 - tetrahydroimidazo[2,1 - b]quinazoline with lithium in liquid ammonia by the procedure of Example 6 gives 7-methoxy-1,2,3,5,6,9-hexahydroimidazo[2,1-b]quinazoline.

Hydrogenating 7-methoxy-1,2,3,5 - tetrahydroimidazo-[2,1-b]quinazoline by the procedure of Example 3 gives 7-methoxy - 1,2,3,5,5a,6,7,8,9,9a - decahydroimidazo[2,1-b]quinazoline.

Hydrogenating 7-methoxy-1,2,3,5 - tetrahydroimidazo-[2,1-b]quinazolin-5-one by the procedure of Example 1, then heating the resulting 7-methoxy-1,2,3,5,6,7,8,9-octahydroimidazo[2,1-b]quinazolin-5-one with sodium bis(2-methoxyethoxy)-aluminum hydride in toluene and working up by the procedure of Example 1 gives 7-methoxy-1,2,3,5,6,7,8,9-octahydroimidazo[2,1-b]quinazoline.

EXAMPLE 8

A mixture of 1.91 g. of 7-methoxy-1,2,3,5-tetrahydroimidazo[2,1-b]quinazoline in 100 ml. of 48% hydrobromic acid is refluxed for 18 hours. The mixture is cooled and the solid material is filtered off. The filtrate is evaporated to give more solid material. Recrystallization of the combined material from aqueous ethanol gives 7-hydroxy-1,2,3,5-tetrahydroimidazo[2,1 - b]quinazoline hydrobromide. An aqueous solution of 1.45 g. of 7-hydroxy-1,2,3,5-tetrahydroimidazo[2,1 - b]quinazoline hydrobromide is basified with saturated aqueous potassium carbonate solution. The precipitate is filtered off, washed with water, and dried to give 7-hydroxy-1,2,3,5-tetrahydroimidazo[2,1-b]quinazoline.

Hydrogenating 7-hydroxy - 1,2,3,5 - tetrahydroimidazo-[2,1-b]quinazoline by the procedure of Example 3 gives 7-hydroxy - 1,2,3,5,5a,6,7,8,9,9a - decahydroimidazo[2,1-b]quinazoline.

Treating 7-hydroxy - 1,2,3,5 - tetrahydroimidazo[2,1-b]quinazoline with lithium in liquid ammonia by the procedure of Example 6 gives 1,2,3,5,6,9-hexahydroimidazo-[2,1-b]quinazolin-7(8H)-one.

By the above procedure, 7-methoxy-1,2,3,5-tetrahydroimidazo[2,1-b]quinazolin-5-one is converted to 7-hydroxy - 1,2,3,5 - tetrahydroimidazo[2,1 - b]quinazolin-5-one which, by the procedure of Example 1, is converted to 7-hydroxy - 1,2,3,5,6,7,8,9 - octahydroimidazo[2,1-b] quinazoline.

EXAMPLE 9

To a solution of 1.93 g. of 7-hydroxy-1,2,3,5,6,7,8,9-octahydroimidazo[2,1-b]quinazoline in 100 ml. of chloroform is added a solution of 2.85 g. of thionyl chloride in 20 ml. of chloroform. The reaction mixture is stirred at 25° C. for 18 hours and refluxed for 30 minutes. The solvent and the excess thionyl chloride are evaporated. The residue is taken up in hot methanol. The mixture is cooled and ether is added. Filtering gives 7-chloro-1,2,3,5,6,7,8,9-octahydroimidazo[2,1 - b]quinazoline hydrochloride. The free base is obtained by dissolving the salt in water, treating with sodium carbonate, then extracting the solution with chloroform and evaporating the solvent from the extract.

By the same procedure using 5.0 g. of thionyl bromide, 7-bromo - 1,2,3,5,6,7,8,9 - octahydroimidazo[2,1-b]quinazoline hydrobromide is obtained. The free base is obtained by the procedure described above.

Using 7-hydroxy - 1,2,3,5,5a,6,7,8,9,9a-decahydroimidazo[2,1-b]quinazoline in the above procedures, the following compounds are obtained:

7-chloro - 1,2,3,5,5a,6,7,8,9,9a - decahydroimidazo[2,1-b]quinazoline 7-bromo - 1,2,3,5,5a,6,7,8,9,9a - decahydroimidazo[2,1-b]quinazoline.

EXAMPLE 10

A mixture of 38.9 g. of 6-methylisatoic anhydride and 29 g. of 2-ethylmercapto-2-imidazoline is heated slowly to 150–170° C. After the gas evolution ceases, the mixture is cooled and recrystallized from ethanol to give 6-methyl - 1,2,3,5 - tetrahydroimidazo[2,1-b]quinazolin-5-one.

Hydrogenating 6-methyl - 1,2,3,5 - tetrahydroimidazo-[2,1-b]quinazolin-5-one by the procedure of Example 1, then heating the resulting 6-methyl-1,2,3,5,6,7,8,9-octahydroimidazo[2,1-b]quinazolin-5-one with sodium bis(2-methoxyethoxy)aluminium hydride in toluene and working up as in Example 1 gives 6-methyl-1,2,3,5,6,7,8,9-octahydroimidazo[2,1-b]quinazoline.

Hydrogenating the above prepared 6-methyl-1,2,3,5,6,7,8,9-octahydroimidazo[2,1-b]quinazoline by the procedure of Example 5 gives the corresponding 1,2,3,5,5a,6,7,8,9,9a-decahydro compound.

A suspension of 6 g. of 6-methyl-1,2,3,5-tetrahydroimidazo[2,1-b]quinazolin-5-one in 500 ml. of tetrahydrofuran is added slowly to a stirred suspension of 2.48 g. of lithium aluminium hydride in 200 ml. of tetrahydrofuran. The mixture is heated at reflux, then treated with 2.5 ml. of water, 2.5 ml. of 15% aqueous sodium hydroxide solution and then 6.5 ml. of water. The mixture is stirred and filtered. The solid material is extracted with 1.5 l. of boiling methanol. The filtrate and extract are combined and evaporated in vacuo to give as the residue 6-methyl-1,2,3,5-tetrahydroimidazo[2,1-b]quinazoline.

By the procedure of Example 6, 6-methyl-1,2,3,5-tetrahydroimidazo[2,1-b]quinazoline is converted to the corresponding 1,2,3,5,6,9-hexahydro compound.

EXAMPLE 11

By the procedure of Example 10, using in place of 6-methylisatoic anhydride the following:

3-methylisatoic anhydride
6-ethylisatoic anhydride
6-propylisatoic anhydride
6-trifluoromethylisatoic anhydride the 9-methyl, 6-ethyl, 6-propyl and 6-trifluoromethyl 1,2,3,5-tetrahydroimidazo[2,1-b]quinazolin-5-ones and 1,2,3,5-tetrahydroimidazo[2,1-b]quinazolines are prepared.

The tetrahydroimidazo[2,1-b]qinazolin-5-ones are converted, by the procedure of Example 1, to the corresponding 9-methyl, 6-ethyl, 6-propyl and 6-trifluoromethyl 1,2,3,5,6,7,8,9-octahydroimidazo[2,1-b]quinazolines.

By the procedures of Examples 3 and 6, the tetrahydroimidazo[2,1-b]quinazolines are converted to the corresponding 9-methyl, 6-ethyl, 6-propyl and 6-trifluoromethyl 1,2,3,5,5a,6,7,8,9,9a-decahydro and 1,2,3,5,6,9-hexahydro compounds, respectively.

EXAMPLE 12

5-n-butylanthranilic acid (19.3 g.) in a mixture of 12 ml. of concentrated hydrochloric acid and 100 ml. of water is treated with phosgene by the procedure described in Example 7. After working up by the procedure of Example 7, 5-n-butylisatoic anhydride is obtained.

5-n-butylisatoic anhydride (10.9 g.) is heated with 6.5 g. of 2-ethylmercapto-2-imidazoline by the procedure of Example 10. After working up by the procedure of Example 10 and recrystallizing from ethanol, 7-n-butyl-1,2,3,5-tetrahydroimidazo[2,1-b]quinazolin-5-one is obtained.

The above prepared quinazolin-5-one is reduced to 7-n-butyl-1,2,3,5-tetrahydroimidazo[2,1-b]quinazoline using lithium aluminium hydride by the procedure described in Example 7.

By the procedure of Example 1, using 7-n-butyl-1,2,3,5-tetrahydroimidazo[2,1-b]quinazolin-5-one as the starting material, the product is 7-n-butyl-1,2,3,5,6,7,8,9-octahydroimidazo[2,1-b]quinazoline.

By the procedure of Example 5, the octahydro compound is converted to 7-n-butyl-1,2,3,5,5a,6,7,8,9,9a-decahydroimidazo[2,1-b]quinazoline.

Using 7-n-butyl-1,2,3,5-tetrahydroimidazo[2,1-b]quinazoline as the starting material in the procedure of Example 6 gives 7-n-butyl-1,2,3,5,6,9-hexahydroimidazo[2,1-b]quinazoline.

EXAMPLE 13

Eight grams of 1,2,3,5-tetrahydroimidazo[2,1-b]quinazoline is mixed with 40 ml. of chlorosulfonic acid previously chilled in an ice bath. The resulting mixture is stirred for 30 minutes and then poured into crushed ice. The solution is carefully neutralized with ammonium hydroxide and the precipitate is filtered off and recrystallized from chloroform to give 7-chlorosulfonyl-1,2,3,5-tetrahydroimidazo[2,1-b]quinazoline.

A solution of 2 g. of the above prepared chlorosulfonyl compound in 100 ml. of chloroform is treated with excess ammonia gas and the mixture is heated in a steel bomb at 100° C. for 30 minutes, then cooled. The precipitate is filtered off and recrystallized from ethanol to give 7-sulfamoyl-1,2,3,5-tetrahydroimidazo[2,1-b]quinazoline.

The above prepared 7-sulfamoyl-1,2,3,5-tetrahydroimidazo[2,1-b]quinazoline is hydrogenated in dilute sulfuric acid in the presence of 5% rhodium-on-carbon by the procedure of Example 3 to give 7-sulfamoyl-1,2,3,5,5a,6,7,8,9,9a-decahydroimidazo[2,1-b]quinazoline.

Using 7-sulfamoyl-1,2,3,5-tetrahydroimidazo[2,1-b]quinazoline as the starting material in the procedure of Example 6 gives 7-sulfamoyl-1,2,3,5,6,9-hexahydroimidazo[2,1-b]quinazoline.

By the procedure described above 1,2,2,5-tetrahydroimidazo[2,1-b]quinazolin-5-one is treated with chlorosulfonic acid and the resulting 7-chlorosulfonyl-1,2,3,5-tetrahydroimidazo[2,1-b]quinazolin-5-one is heated with ammonia in a steel bomb at 100° C. for 30 minutes to give 7-sulfamoyl-1,2,3,5-tetrahydroimidazo[2,1-b]quinazolin-5-one.

Hydrogenating 7-sulfamyol-1,2,3,5-tetrahydroimidazo[2,1-b]quinazolin-5-one by the procedure of Example 1, then heating the resulting 7-sulfamoyl-1,2,3,5,6,7,8,9-octahydroimidazo[2,1-b]quinazolin-5-one with sodium bis(2-methoxyethoxy)aluminum hydride in toluene and working up as in Example 1 gives 7-sulfamoyl-1,2,3,5,6,7,8,9-octahydroimidazo[2,1-b]quinazoline.

EXAMPLE 14

To a solution of 90 g. of chloral hydrate in 1200 ml. of water are added 1300 g. of sodium sulfate and a solution of 82.5 g. of p-butoxyaniline in 300 ml. of water and 43 ml. of concentrated hydrochloric acid. Hydroxylamine hydrochloride (110 g.) in 500 ml. of water is added and the mixture is quickly heated to vigorous boiling. The boiling is continued for about 10 minutes. After cooling, N-(p-butoxyphenyl)-α-hydroxyiminoacetamide crystallizes and is filtered off.

The above prepared acetamide compound (100 g.) is added in portions with stirring to 300 ml. of concentrated sulfuric acid (prewarmed to 50° C.) at a rate so as to keep the temperature between 60-70° C. The reaction mixture is then heated to 80° C. for 10 minutes, then cooled and poured into an ice bath. The precipitate is filtered off and washed with water to give 5-butoxyisatin.

To a stirring solution of 60 g. of 5-butoxyisatin in 600 ml. of glacial acetic acid cooled in an ice bath is added 150 g. of chromium trioxide in portions so as to keep the temperature between 10-15° C. The stirring is continued for 12 hours at 15° C., 1.5 hours at 40° C. and one hour at 75° C. The mixture is cooled and then poured into an ice-water mixture. The precipitate is filtered off and washed well with water to give 5-butoxyisatoic anhydride.

5-butoxyisatoic anhydride (23.5 g.) and 13 g. of 2-ethylmercapto-2-imidazoline are heated together by the procedure of Example 10 to give 7-butoxy-1,2,3,5-tetrahydroimidazo[2,1-b]quinazolin-5-one.

The above prepared quinazolinone is treated with lithium aluminum hydride by the procedure of Example 7 to give 7-butoxy-1,2,3,5-tetrahydroimidazo[2,1-b]quinazoline.

By the procedure of Example 1, using 7-butoxy-1,2,3,5-tetrahydroimidazo[2,1-b]quinazolin-5-one as the starting material, the product is 7-butoxy-1,2,3,5,6,7,8,9-octahydroimidazo[2,1-b]quinazoline.

By the procedure of Example 5, 7-butoxy-1,2,3,5,6,7,8,9-octahydroimidazo[2,1-b]quinazoline is converted to 7-butoxy-1,2,3,5,5a,6,7,8,9,9a-decahydroimidazo[2,1-b]quinazoline.

By the procedure of Example 6, 7-butoxy-1,2,3,5-tetrahydroimidazo[2,1-b]quinazoline is converted to 7-butoxy-1,2,3,5,6,9-hexahydroimidazo[2,1-b]quinazoline.

EXAMPLE 15

1,2,3,4 - tetrahydro - 6H - pyrimido[2,1-b]quinazolin-6-one, dissolved in 2 N sulfuric acid, is hydrogenated using 5% rhodium-on-carbon by the procedure of Example 1 to give 1,2,3,4,7,8,9,10-octahydro-6H-pyrimido-[2,1-b]quinazolin-6-one. By the procedure of Example 1, this quinazolin-6-one is heated at reflux with sodium bis(2-methoxyethoxy)aluminum hydride in toluene and the mixture is worked up to give 1,2,3,4,7,8,9,10-octahydro-6H-pyrimido[2,1-b]quinazoline.

By the procedure of Example 5, this octahydro compound is converted to 1,2,3,4,6a,7,8,9,10,10a-decahydro-6H-pyrimido[2,1-b]quinazoline.

By the procedure of Example 6, 1,2,3,4-tetrahydro-6H-pyrimido[2,1-b]quinazoline is converted to 1,2,3,4,7,10-hexahydro-6H-pyrimido[2,1-b]quinazoline.

EXAMPLE 16

A stirring suspension of 8.0 g. of 1,2,3,5,6,7,8,9-octahydroimidazo[2,1-b]quinazoline, prepared as in Example 1, and 8 ml. of methyl iodide in 150 ml. of methanol is heated in a bomb at 150° C. for 18 hours. The solvent is evaporated off and the solid residue is stirred with 10% aqueous sodium hydroxide solution and extracted with chloroform. The extract is washed with water, dried and evaporated to dryness to give 1-methyl-1,2,3,5,6,7,8,9-octahydroimidazo[2,1-b]quinazoline and 10-methyl - 2,3,5,6,7,8,9,10-octahydroimidazo[2,1 - b]quinazoline. These compounds are separated by chromatography on basic alumina.

By the same procedure, reacting 1,2,3,5,5a,6,7,8,9,9a-decahydroimidazo[2,1-b]quinazoline, prepared as in Example 3, with methyl iodide gives 1-methyl-1,2,3,5,5a,6,7,8,9,9a-decahydroimidazo[2,1 - b]quinazoline and 10-methyl - 2,3,5,5a,6,7,8,9,9a,10 - decahydroimidazo[2,1-b]quinazoline.

In the same manner, reacting 1,2,3,5,6,9-hexahydroimidazo[2,1-b]quinazoline, prepared as in Evample 6, with methyl iodide gives 1-methyl-1,2,3,5,6,9-hexahydroimidazo - [2,1-b]quinazoline and 10-methyl-2,3,5,6,9,10-hexahydroimidazo-[2,1-b]quinazoline.

EXAMPLE 17

By the procedure of Example 16, reacting 1,2,3,5,6,7,8,9 - octahydroimidazo[2,1 - b]quinazoline with ethyl bromide gives 1-ethyl-1,2,3,5,6,7,8,9-octahydroimidazo-[2,1 - b]quinazoline and 10-ethyl-2,3,5,6,7,8,9-10 - octahydroimidazo[2,1-b]quinazoline.

Similarly, reacting 1,2,3,5,5a,6,7,8,9,9a-decahydroimidazo[2,1-b]quinazoline with ethyl bromide gives 1-ethyl-1,2,3,5,5a,6,7,8,9,9a - decahydroimidazo[2,1 - b]quinazoline and 10-ethyl-2,3,5,5a,6,7,8,9,9a,10-decahydromidazo-[2,1-b]quinazoline.

By the same procedure, reacting 1,2,3,5,6,9-hexahydroimidazo[2,1-b]quinazoline with ethyl bromide gives 1-ethyl - 1,2,3,5,6,9 - hexahydroimidazo[2,1-b]quinazoline and 10 - ethyl - 2,3,5,6,9,10 - hexahydroimidazo[2,1-b]quinazoline.

EXAMPLE 18

Reacting 1,2,3,5,6,7,8,9 - octahydroimidazo[2,1-b]quinazoline with butyl bromide by the procedure of Example 16 gives 1-butyl-1,2,3,5,6,7,8,9-octahydroimidazo[2,1 - b]quinazoline and 10-butyl-2,3,5,6,7,8,9,10-octahydroimidazo[2,1-b]quinoline. These compounds are separated by chromatography.

By the same procedure, reacting 1,2,3,5,5a,6,7,8,9,9a-decahydroimidazo[2,1-b]quinazoline with butyl bromide gives 1 - butyl - 1,2,3,5,5a,6,7,8,9,9a - decahydroimidazo-[2,1-b]quinazoline and 10-butyl-2,3,5,5a,6,7,8,9,9a-decahydroimidazo[2,1-b]quinazoline.

Similarly, reacting 1,2,3,5,6,9-hexahydroimidazo[2,1-b]quinazoline with butyl bromide gives 1-butyl-1,2,3,5,6,9- hexahydroimidazo[2,1-b]quinazoline and 10-butyl-2,3,5,6,9,10-hexahydroimidazo[2,1-b]quinazoline.

EXAMPLE 19

A mixture of 0.90 g. of 1,2,3,5,6,7,8,9-octahydroimidazo[2,1-b]quinazoline and 25 ml. of acetic anhydride is heated on a steam bath for 15 minutes, then concentrated and filtered. The filtrate is treated with water, then basified and filtered. The solid material obtained from these two filtrations is combined. This material is 1-acetyl-1,2,3,5,6,7,8,9-octahydroimidazo[2,1-b]quinazoline.

By the same procedure, using 1,2,3,5,5a,6,7,8,9,9a-decahydroimidazo[2,1-b]quinazoline, the product is 1-acetyl - 1,2,3,5,5a,6,7,8,9,9a - decahydroimidazo[2,1 - b]quinazoline.

Similarly, reacting 1,2,3,5,6,9-hexahydroimidazo[2,1-b]quinazoline with acetic anhydride gives 1-acetyl-1,2,3,5,6,9-hexahydroimidazo[2,1-b]quinazoline.

EXAMPLE 20

By the procedure of Example 19, reacting 1,2,3,5,6,7,8,9-octahydroimidazo[2,1 - b]quinazoline with propionic anhydride gives 1-propionyl-1,2,3,5,6,7,8,9-octahydroimidazo[2,1-b]quinazoline.

By the same procedure, reacting 1,2,3,5,5a,6,7,8,9,9a-decahydroimidazo[2,1-b]quinazoline with propionic anhydride gives 1-propionyl-1,2,3,5,5a,6,7,8,9,9a-decahydroimidazo[2,1-b]quinazoline and reacting 1,2,3,5,6,9-hexahydroimidazo[2,1-b]quinazoline with propionic anhydride gives 1-propionyl - 1,2,3,5,6,9 - hexahydroimidazo[2,1-b]quinazoline.

EXAMPLE 21

By the procedure of Example 19, reacting 1,2,3,5,6,7,8,9-octahydroimidazo[2,1-b]quinazoline with butyric anhydride gives 1-butyryl-1,2,3,5,6,7,8,9-octahydroimidazo-[2,1-b]quinazoline.

By the same procedure, reacting 1,2,3,5,5a,6,7,8,9,9a-decahydroimidazo[2,1-b]quinazoline with butyric anhydride gives 1-butyryl-1,2,3,5,5a,6,7,8,9,9a-decahydroimidazo[2,1-b]quinazoline and reacting 1,2,3,5,6,9-hexahydroimidazo[2,1-b]quinazoline with butyric anhydride gives 1-butyryl - 1,2,3,5,6,9 - hexahydroimidazo[2,1-b]quinazoline.

What is claimed is:

1. A compound selected from the group consisting of compounds of the following formulas:

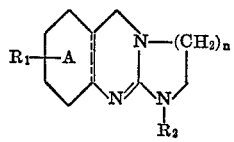 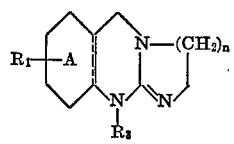

in which:
$R_1$ is hydrogen, chloro, bromo, trifluoromethyl, lower alkyl, lower alkoxy, sulfamoyl or hydroxy;
$R_2$ is hydrogen, lower alkyl or lower alkanoyl;
$R_3$ is lower alkyl;
$n$ is 1 or 2; and
∥ is a single or double bond and when ∥ is a double bond and $R_1$ is hydrogen, trifluoromethyl, lower alkyl, lower alkoxy, sulfamoyl or hydroxy, ring A optionally has one additional double bond in the 7,8-position when $n$ is 1 or in the 8,9-position when $n$ is 2, and pharmaceutically acceptable acid addition salts thereof.

2. A compound of claim 1 in which ring A has one double bond.

3. A compound of claim 1 according to Formula I in which $R_1$ is hydrogen, chloro, methyl or methoxy, $R_1$ being in the 6, 7 or 8 position when $n$ is 1 or in the 7, 8 or 9 position when $n$ is 2, and $R_2$ is hydrogen.

4. A compound of claim 1 according to Formula I in which $R_1$ and $R_2$ are hydrogen.

5. A compound of claim 1, said compound being 1,2,3,5,6,7,8,9-octahydroimidazo[2,1-b]quinazoline.

6. A compound of claim 1, said compound being 1,2,3,5,6,7,8,9-octahydroimidazo[2,1-b]quinazoline fumarate.

7. A compound of claim 1, said compound being 1,2,3,5,5a,6,7,8,9,9a-decahydroimidazo[2,1-b]quinazoline.

8. A compound of claim 1, said compound being 1,2,3,5,5a,6,7,8,9,9a-decahydroimidazo[2,1-b]quinazoline fumarate.

References Cited

UNITED STATES PATENTS 3,621,025   11/1971   Jen et al. _____ 260—256.4 F

NICHOLAS S. RIZZO, Primary Examiner

R. V. RUSH, Assistant Examiner

U.S. Cl. X.R.

260—256.5 R; 424—251